No. 633,840. Patented Sept. 26, 1899.
L. HEAPHY.
POTATO PLANTER.
(Application filed July 13, 1899.)
(No Model.)
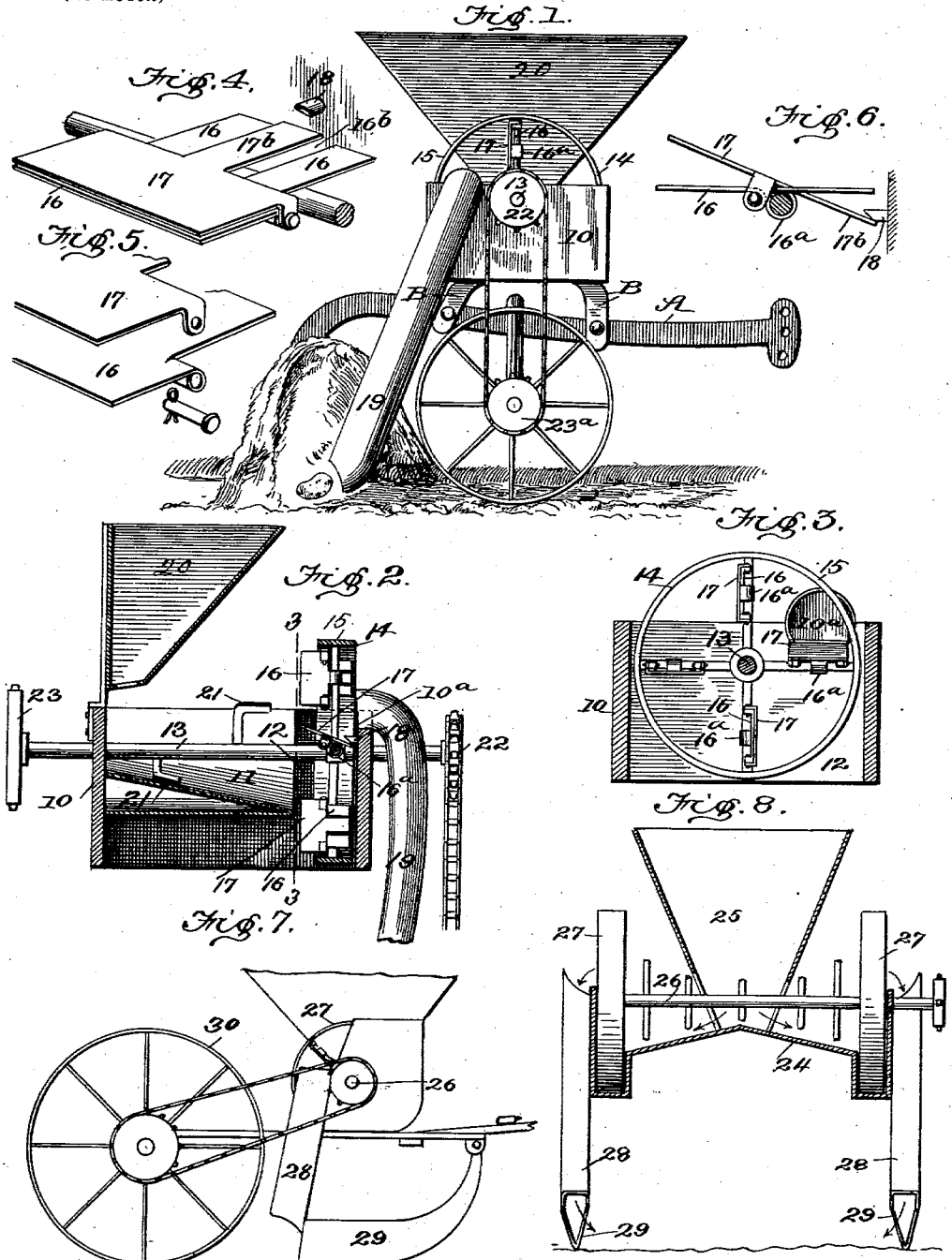
INVENTOR
Leonard Heaphy
BY
ATTORNEYS.

UNITED STATES PATENT OFFICE.

LEONARD HEAPHY, OF WATERTOWN, SOUTH DAKOTA, ASSIGNOR OF ONE-HALF TO JOHN I. MONKS, OF SAME PLACE.

POTATO-PLANTER.

SPECIFICATION forming part of Letters Patent No. 633,840, dated September 26, 1899.

Application filed July 13, 1899. Serial No. 723,706. (No model.)

*To all whom it may concern:*

Be it known that I, LEONARD HEAPHY, of Watertown, in the county of Codington and State of South Dakota, have invented a new and useful Improvement in Potato-Planters, of which the following is a specification.

My invention has for its object a potato-planter which can be attached to any gang, sulky, or other wheeled plow and which will drop either whole or cut potatoes at regular intervals into a furrow which has been made before planting, the potato falling to the right-hand side of furrow directly in front of soil being turned, so that the potatoes will be covered up as soon as dropped.

The invention consists in certain details of construction and combination and arrangement of the parts, which I shall first describe and then point out in the appended claims.

Reference is to be had to the accompanying drawings, in which—

Figure 1 is a side elevation of a wheeled plow with my improved planter attached. Fig. 2 is a transverse vertical section of the dropping devices. Fig. 3 is a vertical section on the line 3 3, Fig. 2, illustrating the feed-wheel. Fig. 4 is a detail perspective view of a portion of a spoke of the feed-wheel with the feed-carrier attached thereto. Fig. 5 is a detail view showing portions of the two plates of the feed-carrier detached. Fig. 6 is a detail view showing the plate 17 in the act of being tilted. Fig. 7 is a side view of a modified form of planting device placed on shoes and covering-wheels, and Fig. 8 is a transverse vertical section thereof.

To the beam A of the plow, as shown, or to any suitable part of the plow-frame my improved planter is secured by adjustable clamps B. The said planter consists of a rectangular box or receptacle 10, provided with a semicylindrical bottom 11, terminating at one side in a well 12. A shaft 13 is mounted to turn in suitable bearings in the ends of the said box and extends a considerable distance beyond each side thereof. A feed-wheel 14 is secured on the shaft so as to rotate in a vertical plane, and the wheel is of such size that its rim 15 extends into the well 12, the said rim being of a width corresponding approximately to the width of the well.

On each spoke of the wheel 14 and near the rim is held a feed-carrier formed of two superposed plates 16 and 17, of which the plate
16 is fixedly held on the spoke by a clip $16^a$ and is formed with a recess $16^b$ adjacent said clip, while the plate 17 is pivoted to tilt on the plate 16 by a hole in an ear of 17, the ear being bent to correspond with hole in 16 and fastened by inserting a pin through them, making it easy to change for a wider plate when desired, and is formed with a finger $17^b$, registering with the recess $16^b$. In making these plates I preferably stamp them out of sheet metal and form the clip $16^a$ by bending the material between the slits made to form the recess $16^b$.

The box 10 is formed with a discharge-opening $10^a$ in its end adjacent the feed-wheel, and as the latter is rotated the feed-carriers successively catch up the potatoes. When a carrier approaches the discharge-opening $10^a$, a catch or trip 18, projecting from the inside of the box near such opening, engages the finger $17^b$, which causes the latter to be depressed into the recess $16^b$ as the wheel further revolves, thereby tilting the plate 17 and throwing the potato out of the opening into a chute 19 and thence into the furrow being covered.

In order to convey the potatoes from the hopper 20, which is supported at the opposite end of the box, I secure arms 21 at suitable intervals along the shaft 13, the said arms being given such a slant that they will push the potatoes toward the wheel as the shaft is rotated.

The conveying and feeding devices described above are actuated from the traveling wheels of the plow by means of sprocket-wheels 22 and 23, secured on the ends of the shaft 13, either one of which, as desired, is connected by chain with one of the sprocket-wheels $23^a$ on the traveling wheels of the plow. The sprocket-wheels 22 and 23 are of different sizes, so that the relative rate of rotation of the traveling wheels and the shaft 13 may be varied to lengthen or shorten the intervals at which the potatoes are dropped.

As illustrated in Figs. 7 and 8, the box 24 is made double—that is, with its bottom sloping from the middle toward each end—and the hopper 25 is placed in the middle of the box. The shaft 26 has two feed-wheels 27 thereon, whereby the potatoes are thrown out into two chutes 28, so as to plant a double row, the earth being opened up by shoes 29 for the reception of the potatoes, which latter are covered up by the covering-wheels 30.

Having thus described my invention, what I claim as new, and desire to secure by Letters Patent, is—

1. In a planter for the purpose described, the combination of the rotary feed-wheel, the conveying devices arranged to convey the feed to said wheel, the pivoted feed-carriers secured to said wheel, and means for successively tilting said carriers whereby to discharge the feed, as set forth.

2. A planter for the purpose described, consisting of the box or receptacle provided with a discharge-opening, the feed-wheel mounted to rotate in a vertical plane in said box and provided with feed-carriers in the form of pivoted plates successively registering with said discharge-opening, and a trip projecting from the inner side of said box and engaging said plates whereby to tilt the same when they approach said openings, as set forth.

3. In a planter for the purpose described, the combination with the box or receptacle, and the feed-wheel mounted therein, of the feed-carrier consisting of a plate secured to a spoke of the wheel, and provided with a recess, a second plate pivotally secured to and normally lying upon the first-named plate, such second plate being formed with a finger registering with the said recess, and means for engaging said finger when the wheel is rotated whereby to tilt the carrier, as set forth.

4. In a planter for the purpose described, a box or receptacle having a sloping bottom terminating in a well and a discharge-opening in its side adjacent said well, a shaft in said receptacle, a feed-wheel on said shaft and located partly within said well, plates fixedly secured to the spokes of said wheel, plates pivotally connected with the fixed plates and arranged to tilt thereon and a trip projecting from a side of said box adjacent the discharge-opening and in the path of the pivoted plates whereby to tilt the latter when they approach said opening, as set forth.

LEONARD HEAPHY.

Witnesses:
H. D. WULRUTH,
H. J. FAHNESTOCK.